Patented Mar. 6, 1923.

1,447,301

UNITED STATES PATENT OFFICE.

GEORGE L. GRIMES, OF DETROIT, MICHIGAN.

ROLL-OVER MECHANISM FOR MOLDING MACHINES.

Application filed December 27, 1920. Serial No. 433,420.

*To all whom it may concern:*

Be it known that I, GEORGE L. GRIMES, citizen of the United States, residing at Detroit, county of Wayne, State of Michigan, have invented a certain new and useful Improvement in Roll-Over Mechanism for Molding Machines, and declare the following to be a full, clear, and exact description of the same, such as will enable others skilled in the art to which it pertains to make and use the same, reference being had to the accompanying drawings, which form a part of this specification.

My invention relates to an improvement in molding machines for founders' use in making castings and the principal object of the present invention is to provide a "roll-over" mechanism whereby the platform on which the flask rests may be inverted preparatory to withdrawing the pattern from the sand.

Heretofore in molding machines of the type shown in the accompanying drawings no provision was made for controlling the movement of the oscillating frame from one position to another and as a consequence the weight and momentum of the frame when under motion caused many accidents and much damage as a result of its operation.

The main object therefore of this invention is to provide a "roll-over" mechanism actuated by compressed air and by which the operator may have complete control of the oscillating frame at all periods of its movement,—the operating mechanism being so "balanced" that its movement may be checked or stopped at any point throughout its path of travel without jar or damage to the machine.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the accompanying drawings forming part of this specification:—

Figure 1:
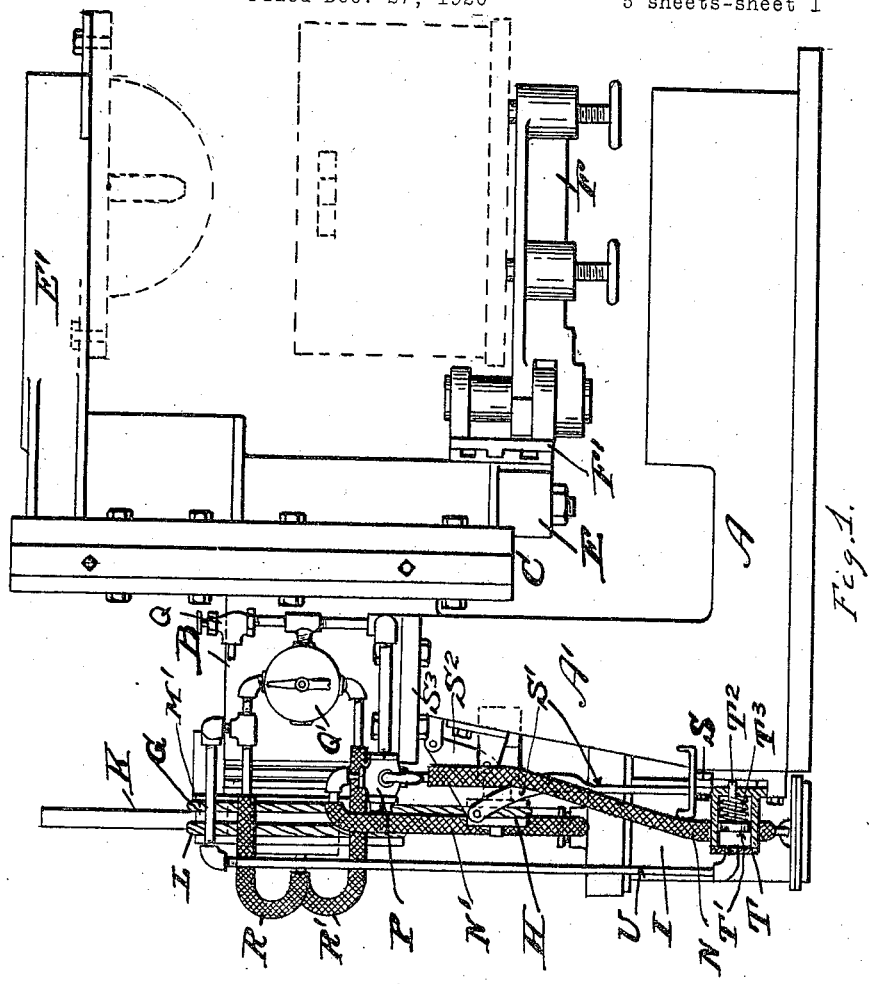
Figure 1 is a side elevation of the machine and its roll-over mechanism showing the flask, and the pattern withdrawn therefrom, in dotted lines.

Referring now to the letters of reference placed upon the drawings:—

A, denotes the main frame of the machine from which rises a standard A'.

B, indicates a bearing bolted to the standard.

C, is an oscillating frame supported by an annular trunnion C', journaled in the bearing B.

D, is a cylinder carried by the oscillating frame.

E, is a slidable yoke-shaped frame bolted to the piston rod $D^2$ of the piston D', and connected with a flask supporting platform E', adapted to be raised or lowered through the operation of the piston D'.

F, F, are pressure-arms pivoted to a plate F', adjustably secured to the oscillating frame C. The foregoing mechanism is similar to that shown in the application for Letters Patent for molding machines filed by me December 27, 1920, Serial No. 433,419, and therefore said mechanism will require no detailed description here.

G, indicates a grooved pulley bolted to the end of the trunnion C'.

H, denotes an idle-pulley supported in a bracket carried by the main frame.

I, is a compressed air cylinder, I' is its piston and $I^2$ a piston rod extending through the end of the cylinder and connected with the housing of the pulleys J and J'.

K, denotes a guide-rod extending upwardly from the sheave housing, adapted to slide through a bracket K' bolted to the frame of the machine.

A cable L, is secured at one end to the bracket K',—it then passes over the sheave J, thence to the pulley G, to which it is secured as indicated at *g*.

M, is a bracket bolted to the frame to which is connected a cable M' which passes around the sheave J', thence around the idle-pulley H, thence over the pulley G, to which it is secured as indicated at $M^2$.

N, and N' are pipes leading from opposite ends of the cylinder I to a suitable fourway valve P, controlling the delivery of air to said cylinder and the exhaust therefrom.

Q, is a valve adapted to control the delivery of air from an air compression chamber (not shown) to the valves Q' and P. The valve Q' controls the delivery of air to the cylinder D, through the pipes R and R' whereby the piston D' may be actuated and the flask supporting platform raised or lowered as described in the co-pending application to which reference has previously been made.

S, indicates a treadle pivoted to the main frame of the machine, connected by a link S', to a bell-crank lever S² pivoted in a bracket secured to the frame.

S³, is a locking bolt connected with the bell-crank lever adapted to be projected into slots S⁴, S⁴, provided in the oscillating frame to secure the frame against further movement until released by the manual operation of the treadle.

T, is a cylinder fitted with a piston T' having a rod T², adapted to be projected under the foot treadle S, to secure the locking bolt S³ in locked relation with the oscillating frame, upon air being admitted to the cylinder T through the pipe U, in turn connected with the air valve Q'.

T³ is a spring to return the piston T' to its initial position upon shutting off the supply of air to the cylinder. The treadle being released, the locking bolt may then be withdrawn to admit the rotation of the oscillating frame.

Having indicated the several parts by reference letters the construction and operation of the machine will be readily understood.

The flask having been jolted through the operation of the piston D' to compact the sand around the pattern the platform is then raised to clamp the follow board to the flask, as described in the application for patent before referred to. The oscillating frame is then "turned-over" by the admission of air through the valve P, into the pipe N and thence to the bottom of the cylinder I; (the exhaust port above the piston being simultaneously opened) the piston I' and its rod I² carrying the sheave J' is thus forced upwardly, as the air above the piston is slowly exhausted, which acting upon the cable M', rotates the pulley G and thereby "turns-over" the flask supporting platform E'. The platform E' may then be raised through the operation of the piston D,—as described in the application before referred to, and the pattern withdrawn from the flask. Air is then admitted to the cylinder T thereby locking the bolt S³ to prevent accidental oscillation of the frame C.

Figure 2:
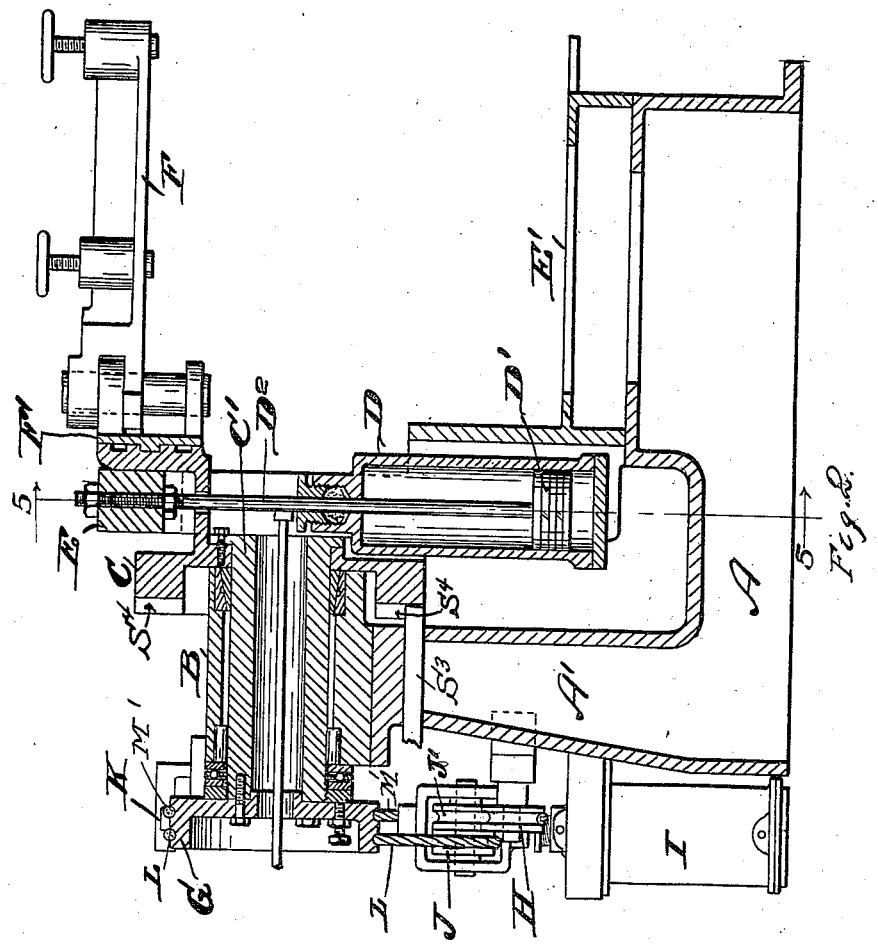
Figure 2 is a longitudinal vertical sectional view of the machine with the flask supporting platform in its initial position to receive a flask.
Figure 3:
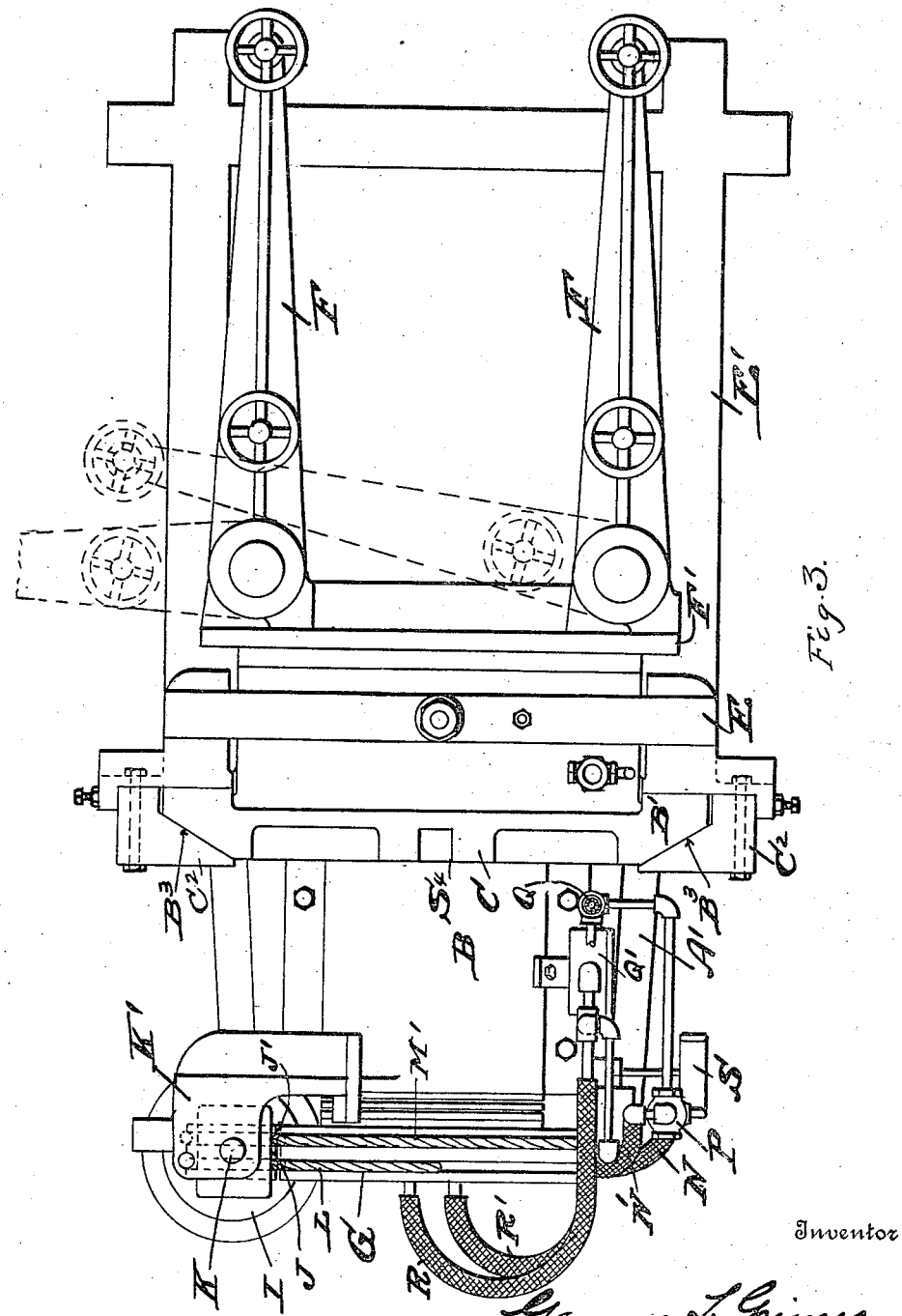
Figure 3 is a plan view of the machine.
Figure 4:
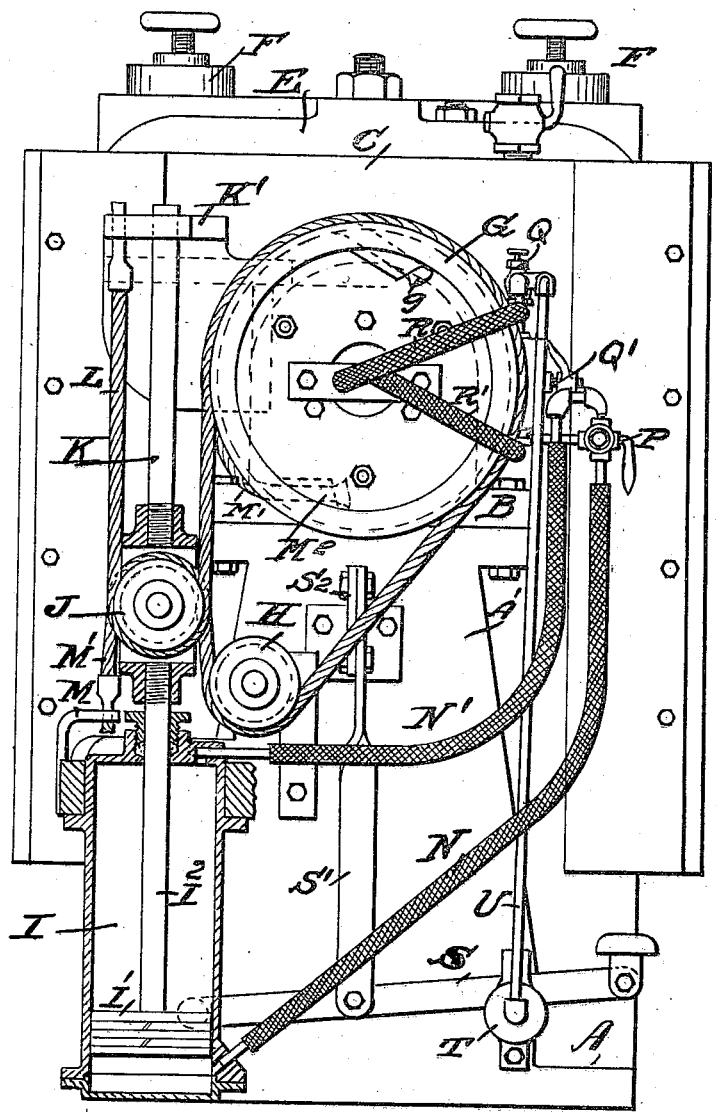
Figure 4 is a rear elevation showing the "turn over" mechanism with parts in section.
Figure 5:
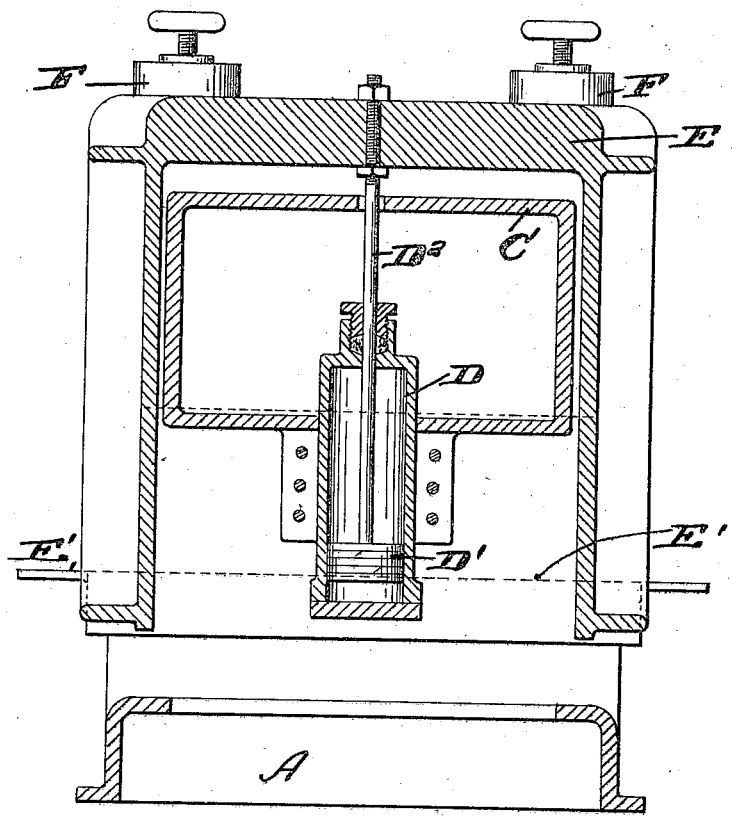
Figure 5 is a vertical cross-sectional view taken on or about line 5—5 of Figure 2.

The flask is now removed from the pressure-arm F, F, upon which it rests, and the oscillating frame reversed by the admission of air into the upper end of the cylinder I, through the valve P and pipe N', thereby forcing the piston I' downwardly and causing the sheave J to act upon the cable L secured at its respective ends to the bracket K' and to the pulley G. The pulley G and the oscillating frame are thus rotated in a reverse direction to that previously described, thereby returning the flask supporting platform to its initial position as shown in Figure 2, to receive another flask.

The oscillating frame is locked in both positions of its movement by the manually operated treadle bolt S³, in turn secured against accidental release by the rod T² of the piston T', which upon being operated through the admission of air into the cylinder T, is projected beneath the treadle to secure the latter against movement until again released.

Having thus described my invention what I claim is:

1. In a molding machine, an oscillating flask supporting frame, means adapted to oscillate said frame alternately in opposite directions, means for locking said frame at each end of its predetermined movement and means for locking said locking means against accidental release.

2. In a molding machine, an oscillating flask supporting frame, a pulley adapted to oscillate said frame, a cylinder, a piston fitted with a piston rod, a sheave carried by the piston rod, means for delivering compressed air to each end of said cylinder alternately to actuate the piston in opposite directions, a pair of cables respectively connected with said pulley and with fixed members of the frame, whereby said cables are acted upon by the sheave through the operation of the piston, that said pulley and frame may be alternately oscillated in opposite directions.

3. In a molding machine, a flask supporting frame, having a trunnion journaled in a bearing in the frame of the machine, a pulley adapted to oscillate said frame bolted to said trunnion, a cylinder, a piston fitted with a rod, a sheave carried by the piston rod, means for alternately delivering compressed air to each end of the cylinder, whereby the piston may be actuated in opposite directions, an idle-pulley, a pair of cables adapted to be acted upon by the sheave pulley and respectively connected with said first named pulley and with fixed members of the frame, one of said cables being also carried by the idle-pulley, whereby upon the piston operating in alternate directions due to admission of air to opposite ends of the cylinder said flask supporting frame will be alternately oscillated in opposite directions.

4. In a molding machine, an oscillating flask supporting frame, means adapted to oscillate said frame alternately in opposite directions, a treadle actuated bolt adapted to secure said oscillating flask supporting frame upon reaching the limit of its movement in either direction, a cylinder, a piston having a stem adapted to be projected into the path of the treadle for actuating the bolt, whereby the bolt may be locked against accidental release, means for delivering air to the cylinder to actuate the piston, and means for returning the piston to its initial position, whereby the treadle may be released that the bolt may be withdrawn.

In testimony whereof, I sign this specification in the presence of two witnesses.

GEORGE L. GRIMES.

Witnesses:
S. E. THOMAS,
GEORGE H. LOVEQUEST.